US012781016B2

(12) United States Patent
Bang

(10) Patent No.: US 12,781,016 B2
(45) Date of Patent: Nov. 3, 2026

(54) APPARATUS AND METHOD FOR REPRODUCING RECYCLABLE EVA MATERIAL FROM EVA WASTE

(71) Applicant: Jai Woong Bang, Jakarta Selatan (ID)

(72) Inventor: Jai Woong Bang, Jakarta Selatan (ID)

( * ) Notice: Subject to any disclaimer, the term of this patent is extended or adjusted under 35 U.S.C. 154(b) by 532 days.

(21) Appl. No.: 18/487,379

(22) Filed: Oct. 16, 2023

(65) Prior Publication Data

US 2025/0122351 A1 Apr. 17, 2025

(51) Int. Cl.

| | |
|---|---|
| ***C08J 11/12*** | (2006.01) |
| ***B29B 17/00*** | (2006.01) |
| ***B29B 17/02*** | (2006.01) |
| ***B29B 17/04*** | (2006.01) |
| *B29K 23/00* | (2006.01) |

(52) U.S. Cl.

CPC ........... *C08J 11/12* (2013.01); *B29B 17/0026* (2013.01); *B29B 17/02* (2013.01); *B29B 17/0404* (2013.01); *B29B 2017/0217* (2013.01); *B29K 2023/083* (2013.01); *C08J 2329/04* (2013.01)

(58) Field of Classification Search

USPC ........................................................ 521/40.5

See application file for complete search history.

(56) References Cited

U.S. PATENT DOCUMENTS

2007/0161719 A1* 7/2007 Rauh ......................... B29B 9/12 521/40
2007/0212531 A1* 9/2007 McIntyre ............ B29B 17/0042 425/149

FOREIGN PATENT DOCUMENTS

KR 10-2015-0052876 A 5/2015
KR 10-1774973 B1 9/2017
KR 10-1856884 B1 5/2018
WO WO-2014039218 A1 * 3/2014 ............ C08K 3/013

* cited by examiner

*Primary Examiner* — Terressa Boykin
(74) *Attorney, Agent, or Firm* — You & IP, LLC

(57) ABSTRACT

A method of producing recyclable Ethylene-vinyl acetate (EVA) material from EVA waste comprises: first step of inputting the EVA waste a first heating chamber; second step of breaking or weakening crosslinking chains of the EVA waste; third step of obtaining recyclable EVA material by extruding the EVA waste obtained in the second step using a first extruder; fourth step of curing the recyclable EVA material obtained in the third step at room temperature for a predetermined amount of time; fifth step of breaking or weakening the crosslinking chains remaining in the recyclable EVA material; sixth step of extruding the recyclable EVA material obtained in the fifth step using a second extruder and forming the recyclable EVA material to pellets using a first pelletizer; seventh step of removing impurities from the recyclable EVA material obtained in sixth step.

18 Claims, 5 Drawing Sheets

APPARATUS AND METHOD FOR REPRODUCING RECYCLABLE EVA MATERIAL FROM EVA WASTE

DESCRIPTION OF THE INVENTION

Background of the Invention

Ethylene-vinyl acetate (EVA) is a copolymer of ethylene and vinyl acetate. EVA's properties vary depending on the relative amount of vinyl acetate to ethylene, and its uses can vary depending on its properties. For example, EVA with high percentage of vinyl acetate, is widely used in products such as shoes, replacing rubber with EVA.

EVA foam is manufactured by combining ingredients such as EVA polymer, fillers, pigments, crosslinking agents, blowing agents, and processing aids. In other words, when these ingredients are exposed to high temperature conditions, the blowing agent is activated to release gases such as carbon dioxide or nitrogen, thereby forming the EVA foam. In particular, when making EVA foam, the high temperature conditions activate the crosslinking agent, which reacts with the EVA polymer and serves to strengthen the bonds between molecules. Because of these characteristics, EVA foam is used for a variety of purposes, such as shoes.

Meanwhile, as the production of products based on EVA and EVA foam increases, the amount of EVA and EVA foam waste also increases. This causes not only an economic loss, but also serious environmental problems because the EVA material does not biodegrade easily or quickly. Moreover, crosslinked EVA material causes even more serious environmental problems because it is hardly decomposed. Therefore, interest in recycling of these wastes has been increasing recently, but the recycling rate of EVA waste is still very low and there are not many recycling facilities. The reason why the recycling rate of EVA waste is low is that EVA waste itself cannot be recycled, or even when it is possible, it costs a lot of money or requires the use of harmful chemicals to separate the contained chemicals or materials.

As a result, EVA waste is mainly recycled by simply crushing the EVA waste into small pieces. However, since the crosslinked EVA waste no longer has the characteristics of EVA, the crushed EVA waste serves only as a simple filler or weighting agent. Therefore, only a small amount of crushed EVA waste is either used as-is or used for items such as low-cost sandals, and the majority of EVA waste is landfilled as garbage.

BRIEF SUMMARY OF THE INVENTION

The present invention is developed to solve the aforementioned problems. Since the apparatus and method according to the present invention are capable of restoring properties of the original EVA material by breaking or weakening crosslinking chains of the EVA waste without adding harmful chemicals, it is very beneficial economically and environmentally.

In one embodiment of the present invention, a method of producing recyclable Ethylene-vinyl acetate (EVA) material from EVA waste comprises: first step of inputting EVA waste into a first heating chamber; second step of breaking or weakening crosslinking chains of the EVA waste, the second step including: heating the EVA waste in the first heating chamber to 180-200° C. using a heater, and rotating a rotor at 40-60 rpm to agitate the EVA waste; third step of obtaining recyclable EVA material by extruding the EVA waste obtained in the second step using a first extruder; fourth step of curing the recyclable EVA material obtained in the third step at room temperature for a predetermined amount of time; fifth step of breaking or weakening the crosslinking chains remaining in the recyclable EVA material, the fifth step including: inputting the recyclable EVA material obtained in the fourth step into a second heating chamber, heating the recyclable EVA material in the second heating chamber, and agitating the recyclable EVA material; sixth step of extruding the recyclable EVA material obtained in the fifth step using a second extruder and forming the recyclable EVA material to pellets using a first pelletizer; seventh step of removing impurities from the recyclable EVA material obtained in sixth step, the seventh step including: pulverizing the recyclable EVA material to particles of a predetermined size using a pulverizing machine, and classifying the particles using a classifier to remove the impurities.

In another embodiment of the present invention, the second step further including: maintaining pressure inside the heating chamber at 9 kg/cm2 to 11 kg/cm2.

In another embodiment of the present invention, the first heating chamber used in the second step and the second heating chamber used in the fifth step are the same one.

In another embodiment of the present invention, a duration of said heating the EVA waste in the second step is about 1 hour, and a duration of said heating the recyclable EVA material in fifth step is about 20-30 minutes.

In another embodiment of the present invention, in third step, the EVA waste is heated to 180-200° C. while passing through the first extruder.

In another embodiment of the present invention, in the fourth step, the predetermined amount of time for curing is 1-2 days.

In another embodiment of the present invention, in the seventh step, the classifier classifies the particles according to weight or size of the particles.

In another embodiment of the present invention, in the seventh step, the predetermined size of the particles is 1 mm.

In another embodiment of the present invention, the method further comprises eighth step of extruding the recyclable EVA material obtained in seventh step using a third extruder and forming the recyclable EVA material to pellets using a second pelletizer.

In another embodiment of the present invention, the third extruder used in eighth step and the second extruder used in sixth step is the same one.

In another embodiment of the present invention, an apparatus for producing recyclable Ethylene-vinyl acetate (EVA) material from EVA waste comprises: a first heating chamber including: a chamber body capable to maintain an internal temperature and maintain an internal pressure; an inlet provided at a side of the chamber body to input EVA waste; a rotor installed at a side of the chamber body to provide rotational force; a rotating plate provided at one end of the rotor and configured to agitate the EVA waste while rotating; a heater provided inside or outside the chamber body and configured to heat the inside of the chamber; and a pressurizer for applying pressure to the EVA waste introduced into the first heating chamber; and a first extruder configured to extrude the EVA waste processed by the first heating chamber to make recyclable EVA material; wherein the pressurizer is configured to apply the pressure of 9 kg/cm2 to 11 kg/cm2 to the EVA waste inside the first heating chamber; the rotor is configured to rotate at 40-60 rpm to agitate the EVA waste inside the first heating chamber; the heater is configured to heat the EVA waste inside the first heating chamber to 180-200° C., thereby breaking crosslinking chains of the EVA waste.

In another embodiment of the present invention, the apparatus further includes a second heating chamber, a second extruder, and a first pelletizer, wherein the second heating chamber is configured to heat the recyclable EVA material obtained from the first extruder, the second extruder and the first pelletizer are configured to form the recyclable EVA material into pellets.

In another embodiment of the present invention, the apparatus further comprises a pulverizing machine and a classifier, wherein the pulverizing machine is configured to form the recyclable EVA material obtained from the first pelletizer into particles of a predetermined size; the classifier is configured to remove impurities from the particles.

In another embodiment of the present invention, the first extruder is configured to heat the EVA waste to 180-200° C.

In another embodiment of the present invention, the classifier is a centrifuge that classifies the impurities according to weight or size of the pellets.

In another embodiment of the present invention, the pulverizing machine includes rotating blades that is configured to break the recyclable EVA material into small pieces, and a screen having a plurality of holes of a predetermined diameter.

In another embodiment of the present invention, the predetermined diameter is 1 mm.

In another embodiment of the present invention, the apparatus further third comprises a extruder and a second pelletizer, wherein the third extruder and the second pelletizer are configured to extrude the recyclable EVA material obtained from the classifier to form pellets.

DETAILED DESCRIPTION OF THE INVENTION

As described above, in order to obtain a recyclable EVA material from EVA waste, it is important to effectively break (or destroy or weaken) crosslinking chains from the EVA waste. Therefore, in the present invention, a specially designed heating chamber is used to break (or destroy or weaken) the crosslinking chains of EVA waste and an extruder is used to produce recyclable EVA material. The present invention provides an apparatus and method to produce recyclable EVA material that is harmless to the human body at a low cost.

Figure 1:
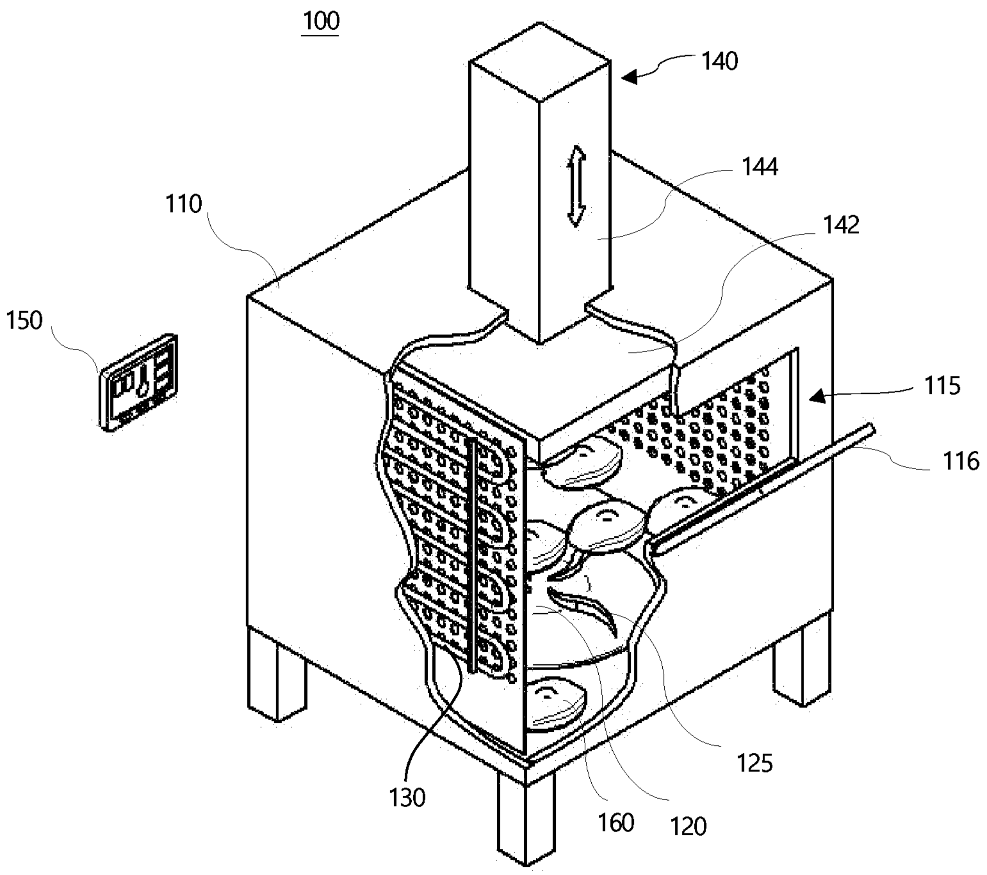
FIG. 1 shows an embodiment of a heating chamber according to the present invention.

FIG. 1 shows an embodiment of a heating chamber for breaking crosslinking chains in EVA waste according to the present invention.

The heating chamber 100 shown in FIG. 1 includes a chamber body 110, a rotor 120 for agitating the EVA waste in the heating chamber 100, a heater 130 for applying heat to the inside of the heating chamber 100, a pressurizer 140 for applying pressure to the inside of the heating chamber 100, and a controller 150 to control the heating chamber 100. Here, the chamber body 110 shown in FIG. 1 is a partial sectional view to show the heater 130 and the pressurizer 140 for illustration purposes.

The chamber body 110 may be sealed to maintain a predetermined pressure and insulated to maintain a predetermined temperature. Any material can be used for the chamber body 110, as long as it can withstand high temperature and high pressure, for example but not limited to, stainless steel, metal alloy, etc. The size of the chamber body 110 may be designed in various sizes depending on the amount of EVA waste input. There are no restrictions on the shape of the chamber body 110, and any shape, such as cube, rectangular, cylindrical, spherical, etc., can be selected based on the installation location or design.

An inlet 115 may be provided at one side of the chamber body 110, and there are no restrictions on the location or shape of the inlet 115. The inlet 115 may be provided with a door 116 to input materials therethrough when it opens, and to maintain the pressure and temperature when it is closed. The size of the inlet 115 can be any size that is suitable for inputting EVA waste or for access for any repairs. The shape of the inlet 115 may also vary, such as a square, circle, or oval, and can be changed based on the design, FIG. 1 shows an embodiment of the chamber body 110 which has the inlet 115 in a side wall thereof.

The Rotor 120 may be provided at one side of the heating chamber 100. The rotor 120 agitates the EVA waste 160 located inside the chamber so that it can be heated evenly. A rotating plate (or rotating fan) 125 may be provided on one side of the rotor 120 to efficiently agitate the EVA waste. The rotating plate 125 may have various structures depending on the type of EVA waste being input. For example, it may be a plate-shape with an inclined angle, a fan-shape like a propeller, a rod-shape similar to a stick, or a pole-shaped equipped with screw-type wings, etc. Additionally, when necessary, the rotating plate 125 may have a structure that can be replaced at any time. The rotor 120 may be rotated by an actuator (not shown) provided inside or outside the chamber, such as an electric motor or gas engine. In addition, the rotational speed of the rotor 120 may be controlled by the controller 150.

The heater 130 may be provided to apply heat to the EVA waste 160 located inside the heating chamber 100. It is desirable that the temperature can be controlled by the controller 150. The heater 130 can be any type as long as it has a structure that can apply heat to the inside of the heating chamber 100. For example, it may be an electric heater, or a hot air blower that supplies heat from the outside to the inside. As an example, FIG. 1 shows that the electric heater 130 is provided in the wall of the chamber body 110. However, the installation location of the heater 130 is not limited to the example.

The heating chamber 100 may be provided with pressurizer 140 to apply a predetermined pressure to the inside of the chamber body 110 and/or the EVA waste. The pressurizer 140 can have various structures depending on the structure of the chamber body and type of EVA waste input. For example, the pressurizer 140 may be a means of applying physical pressure by pressing with a pressure plate. It may be a means of applying pressure by applying air pressure from the outside. Regardless of the structure, the pressure applied by the pressurizer to the heating chamber 100 may be controlled by the controller 150.

FIG. 1 shows an example of a pressurized that applies physical pressure using a pressure plate. The pressurizer 140 shown in FIG. 1 includes a pressure plate 142 having a width sufficient to cover one surface inside the chamber body 110 and a connecting rod 144 connected to the pressure plate 142 configured to apply force to the pressure plate 142. The connecting rod 144 can move up and down or back and forth by physical force applied from the outside, Therefore, the pressure plate 142 connected to the connecting rod 144 may be moved within the chamber to apply pressure to the inside of the heating chamber 100 and the EVA waste.

The controller 150 may be provided on the heating chamber 100 or at a remote location, and may control the temperature and pressure of the heating chamber 100, as well as the speed of the rotor 120. For example, if the heating chamber 100 is a standalone type, the controller 150 can be installed on the heating chamber 100, and if the heating chamber 100 is to be controlled remotely, the controller 150 may be movably installed at a remote location. Additionally, the controller 150 may transmit signals using wired or wireless methods, FIG. 1 shows an embodiment of, but not limited to, the controller 150 provided remotely from the heating chamber 100 and controlling the heating chamber 100 wirelessly.

A method of breaking or weakening the crosslinking chains of EVA waste using the heating chamber 100 will be described in more detail.

The first step in converting EVA waste into recyclable EVA material is performed by the heating chamber 100. That is, EVA waste to be recycled is put into the heating chamber 100 through the inlet 115 provided in the chamber body 110, and the EVA waste 160 is heated to a predetermined temperature. During this time, the rotor 120 may be rotated so that the heat is evenly applied to the EVA waste 160. The temperature and time for heating the EVA waste are crucial factors for turning EVA waste 160 into recyclable EVA material. Heating temperature and time may vary depending on the material of the input EVA waste, but in general, it is desirable for the heating temperature to be around 180-200 degrees, and the heating time to be more than 60 minutes. Meanwhile, the heating temperature and heating time may be controlled using the controller 150.

Additionally, a predetermined pressure may be applied to the inside of the heating chamber 100 if necessary. The pressure applied may vary depending on the type of EVA waste input, but in general, it is desirable to maintain the pressure at around 9 kg/cm2-11 kg/cm2. Here, the applied pressure can also be controlled using the controller 150.

FIG. 1 shows an embodiment in which EVA waste 160 being put into heating chamber 100 is heated using heater 130, and is pressured using pressurizer 140. At this time, the EVA waste may be agitated by rotating the rotor 120 and the rotating plate 125 so that the heat is applied evenly to the EVA waste 160. The rotating speed of the rotor 120 can vary depending on the material or amount of EVA waste input and in general, the rotating speed of around 50 rpm is desirable. At this time, the rotation speed of the rotor can be controlled using the controller 150.

As such, when a predetermined temperature and predetermined pressure are applied for a predetermined time while rotating the rotor 120 or in a stationary state, EVA material of which a significant portion of crosslinking chains are broken or weakened from EVA waste can be obtained. The processing time using the above heating chamber may vary depending on the type and amount of EVA waste, but generally about 1 hour is appropriate under the above conditions.

Figure 2:
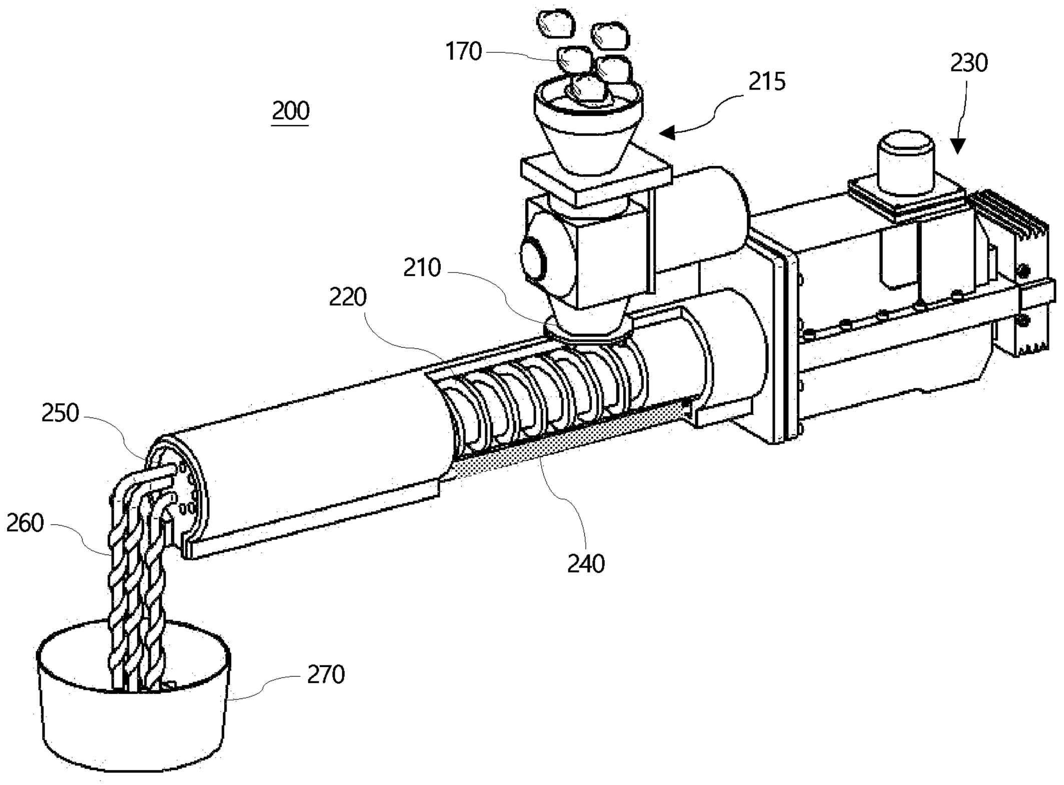
FIG. 2 shows an embodiment of an extruder to produce a recyclable EVA material.

Meanwhile, in the EVA waste processed by heating chamber 100, residual crosslinking chains that have not yet been destroyed completely may maintain bonding force. Therefore, a work process using an extruder can be performed to further break or destroy the crosslinking chains that still maintain bonding force, FIG. 2 shows an embodiment of an extruder to further break the crosslinking chains and produce a recyclable EVA material.

Here, extruder 200 may include an inlet 210 for inputting the EVA waste (or EVA material) processed in heating chamber 100, a hopper 215 for facilitating the input of the EVA material and controlling the input amount, a rotating screw 220 provided inside the extruder 200 for breaking the crosslinking chains by compressing and extruding the EVA material, and a driver 230 for driving the rotating screw 220. Additionally, the extruder 200 may be equipped with an extruder heater 240. The extruder 200 shown in FIG. 2 is a partial sectional view to show the rotating screw 220 for illustration purposes.

EVA waste or material 170 processed in the heating chamber 100 may be input into the extruder 200 through hopper 215. Although it is common to input EVA waste 170 using hopper 215, it is not limited to this example. For example, EVA waste 170 processed in heating chamber 100 may be directly transferred into the inlet 210 of the extruder without passing through hopper 215. Additionally, the EVA waste 170 may be automatically introduced into the hopper 215 or the inlet 210, or may be added manually using a container (not shown).

The EVA waste 170 input into the extruder 200 is extruded by the rotating screw 220 which is rotated by the driving driver 230 and discharged to the outside of the extruder 200, thereby further breaking or weakening the crosslinking chains of the EVA material. At this time, the EVA waste 170 passing the extruder 200 may be heated to about 180-200 degrees by the extruder heater 240.

The EVA waste 170 may be formed, while passing the extruder 200, to a twisted shape like twisted churro. By this process, most of the residual crosslinking chains remaining in the EVA waste 170 are removed, and the EVA waste 170, having a twisted shape, is discharged to the outside through outlet 250 of the extruder 200. The discharged material can be automatically transported or placed in a container 270 for the next stage of processing. Here, the EVA waste 170 obtained from the extruder 200 does not necessarily have to be in a twisted shape and in constant length either.

The EVA waste that is obtained from the process by the extruder 200 is itself an EVA material that can be recycled. Meanwhile, since the EVA waste of which the crosslinking chains are broken may contain materials used for crosslinking chains such as a crosslinking agent, a separate process may be required to remove the materials, but there is no problem if the broken material is left as is in the EVA material. So, hereinafter, a "recyclable EVA material" refers to the material obtained from the process using the extruder 200 or processes thereafter.

Meanwhile, the recyclable EVA material that has gone through the process by the extruder may have a curing time of 1-2 days at room temperature, if necessary. The crosslinking chains may not yet be completely separated from the recyclable EVA material whose crosslinking chains have been broken through primary processes using the heating chamber and extruder described above. Thus, it may be aged at room temperature for a predetermined period of time so that the crosslinking chains can be completely separated from the material. Generally, since plastic tends to deteriorate if left at high temperature and pressure for a long time, this curing time also is effective to prevent this deterioration.

After having the curing time, the recyclable EVA material may have secondary processes using heating chamber and extruder. If there are crosslinking chains that still maintain bonding force, they may be destroyed more reliably through these secondary processes.

The secondary heating chamber process may be performed using the same heating chamber 100 used in the primary process, or a separate heating chamber. Assuming that the heating chamber 100 shown in FIG. 1 is used, the recyclable EVA material that has gone through the curing process is input into the heating chamber 100 through the inlet 115 provided in the chamber body 110, and the recyclable EVA material is heated to a predetermined temperature. At this time, the rotor 120 may also be rotated to agitate the recyclable EVA material placed inside the heating chamber so that the heat is evenly applied to the recyclable EVA material. Heating temperature and time may vary depending on the characteristic of the recyclable EVA material, but it is preferable to heat the recyclable EVA material at 180-200 degrees for 20-30 minutes. Here, heating temperature and heating time can be controlled using the controller 150.

Additionally, if necessary, a predetermined pressure may be applied to the inside of the heating chamber 100. The pressure applied may also vary depending on the type of recyclable EVA material. In general, it is desirable to maintain the pressure at around 9 kg/cm2-11 kg/cm2. Here, the applied pressure can be controlled using the controller 150. In addition, the recyclable EVA material may be agitated by rotating the rotor 120 and the rotating plate 125 so that heat is evenly applied to the recyclable EVA material. The rotation speed of the rotor 120 may vary depending on the type or amount of recyclable EVA material but generally around 50 rpm is preferable. The rotation speed of the rotor may also be controlled using the controller 150.

As such, by applying a predetermined temperature and a predetermined pressure for a certain period of time, while rotating the rotor 120, or in a stationary state, the crosslinking chains remaining in the recyclable EVA material may be further broken or weakened. The secondary processing time using the heating chamber may vary depending on the type or amount of EVA material, but generally about 20-30 minutes is desirable above conditions.

Figure 3:
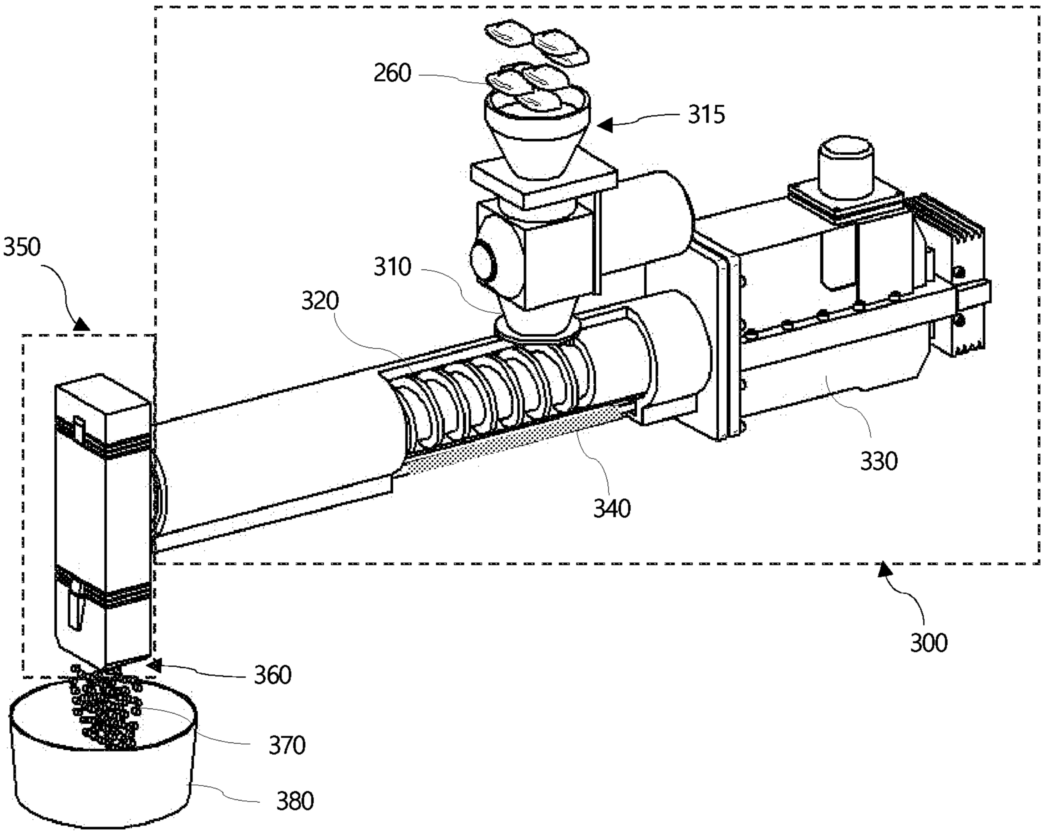
FIG. 3 shows an embodiment of another extruder and a pelletizer to pelletize the recyclable EVA material.

Next, the recyclable EVA material processed by the heating chamber may be subjected to a secondary extrusion process. As shown in FIG. 3, the secondary extrusion process may be performed using an extruder 300 and a pelletizer 350. Here, the extruder 300 includes an inlet 310 for inputting the recyclable EVA material, a hopper 315 to facilitate the input of the recyclable EVA material and control the input amount, and a rotating screw 320 located within the extruder 300 to further break or weaken the crosslinking chains by compressing and extruding the recyclable EVA material, and a driver 330 that drives the rotating screw 320. Additionally, the extruder 300 may be equipped with an extruder heater 340. Here, the extruder 300 shown in FIG. 3 is a partial sectional view to show the rotating screw 320 for illustration purposes.

The recyclable EVA material 260 that has processed by the heating chamber may be input into the extruder 300 through the hopper 315. Generally, the recyclable EVA material 260 can be input using the hopper 315, but it is not limited to this. For example, the recyclable EVA material 260 may be input directly through the inlet 310 of the extruder without using the hopper 315. In addition, the recyclable EVA material 260 may be introduced into the hopper 315 or the inlet 310, either automatically using a conveyer (not shown) or manually using a container (e.g., 270).

The recyclable EVA material 260 injected into the extruder 300 may be compressed by the rotating screw 320 rotated by the drive 330 and may move forward to the pelletizer 350, thereby further breaking the crosslinking chains, if any. At this time, the recyclable EVA material 260 passing through the extruder 300 may be heated to about 180-200 degrees by the extruder heater 340.

The recyclable EVA material 260 that has passed through the extruder 300 may be formed into small-sized pellets 370 by the pelletizer 350. In this process, most of the residual crosslinking chains remaining in the recyclable EVA material may be destroyed, and the recyclable EVA material formed into the small-sized pellets 370 is discharged to the outside through an outlet 360 of the pelletizer 350. The discharged material can be automatically transported or placed in a container 380 for further processing.

The recyclable EVA material 260 that has completed the process using the extruder 300 and pelletizer 350 may have little crosslinking chains, but may contain some impurities and hardened EVA material and may not be uniform in size. Therefore, additional processes may be performed to remove the impurities contained in the recyclable EVA material 370, uniformize the size of the EVA material, and separate the hardened EVA material.

Figure 4:
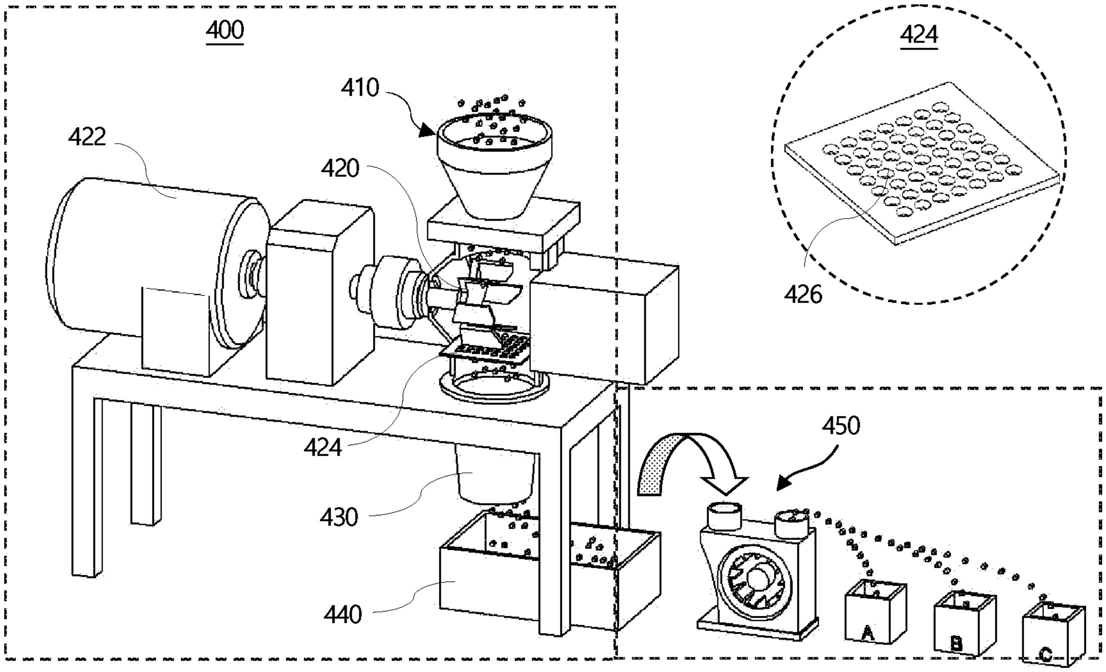
FIG. 4 shows an embodiment of a pulverizing machine and a classifier to remove impurities from the recyclable EVA material.

FIG. 4 shows an embodiment of a pulverizing machine and a classifier to remove impurities from the recyclable EVA material.

The recyclable EVA material, in the form of pellets 370, that has gone through a secondary extrusion process may be made into particles of uniform size using a pulverizing machine 400. Additionally, the pulverized EVA material may be classified using classifier 450. For this purpose, pellet 370, that is, the recyclable EVA material, obtained in the secondary extrusion process, is input into the pulverizing machine 400 through the hopper 410. The inputted recyclable EVA material may be crushed into small pieces by the rotating blade 420 provided inside the pulverizing machine 400. The rotating blade 420 is rotated by the driver 422, wherein the driver 422 may be a motor, or similar. The rotating blade 420 does not necessarily have to be a blade, but can be any structure that can crush the EVA material into small pieces, and push the pieces to move forward. Here, the pulverizing machine 400 shown in FIG. 4 is a partial sectional view to show the rotating blade 420 for illustration purposes.

The recyclable EVA material is finely crushed or pulverized by the rotating blade 420 and pushed out to pass through a screen 424, in which the screen includes a number of holes of a predetermined size. Screen 424 may be made of any material that has a predetermined strength. The size of holes 426 in screen 424 can be adjusted by replacing the screen based on the type of recyclable EVA material and the type of pulverizing machine, etc., but for this example, the size is uniformly 1 mm. As an example, as shown in FIG. 4, the screen 424 may be installed below the rotary blade 420, and the recyclable EVA material broken into small pieces by the rotating blade 420 is pushed toward the screen 424 and passed through the screen, whereby the particles may have a spherical shape of uniform size.

The recyclable EVA material pulverized into small sizes, i.e., particles, is discharged through the outlet 430 of the pulverizing machine 400, and the discharged recyclable EVA material is collected by the container 440, or automatically transferred to classifier 450 for further processing.

Classifier 450 may be used to separate impurities from the recyclable EVA material and filter out particles of different weights or sizes. In general, the impurities contained in the material have different density than the recyclable EVA material, so even for particles of the same size may have different weights. In addition, even for the same type of EVA material, the weight may vary depending on the size. Taking this into account, a centrifuge may be used as classifier 450 to separate out recyclable EVA materials of high-quality. In other words, when the pulverized recyclable EVA material obtained by the pulverizing machine 400 is passed through the centrifuge 450 as shown in FIG. 4, the material can be separated according to the type or weight or size of the particles. For example, as shown in FIG. 4, depending on the particle weight or size or material, heavy impurities or heavy EVA materials may be collected at position A, which is closer to the centrifuge, light impurities or light EVA materials may be collected at position C, which is further away from the centrifuge, and the recyclable EVA material in an appropriate size and weight may be collected at position B, which is in the middle section. Thus, high-quality recyclable EVA material may be obtained at position B.

As an example, when the EVA material pulverized by the pulverizing machine 400 is processed by the centrifuge 450, the EVA material is separated and accumulated within the 12 m range. At this time, the EVA material piled up within the 1 m range on both ends of the width of 12 m can be removed, and the recyclable EVA material accumulated within the center 10 m range can be collected for recyclable EVA material of high-quality.

Meanwhile, the recyclable EVA materials of high-quality that have obtained by the classification may be packaged as final products or made into pellets again to facilitate transportation and processing.

Figure 5:
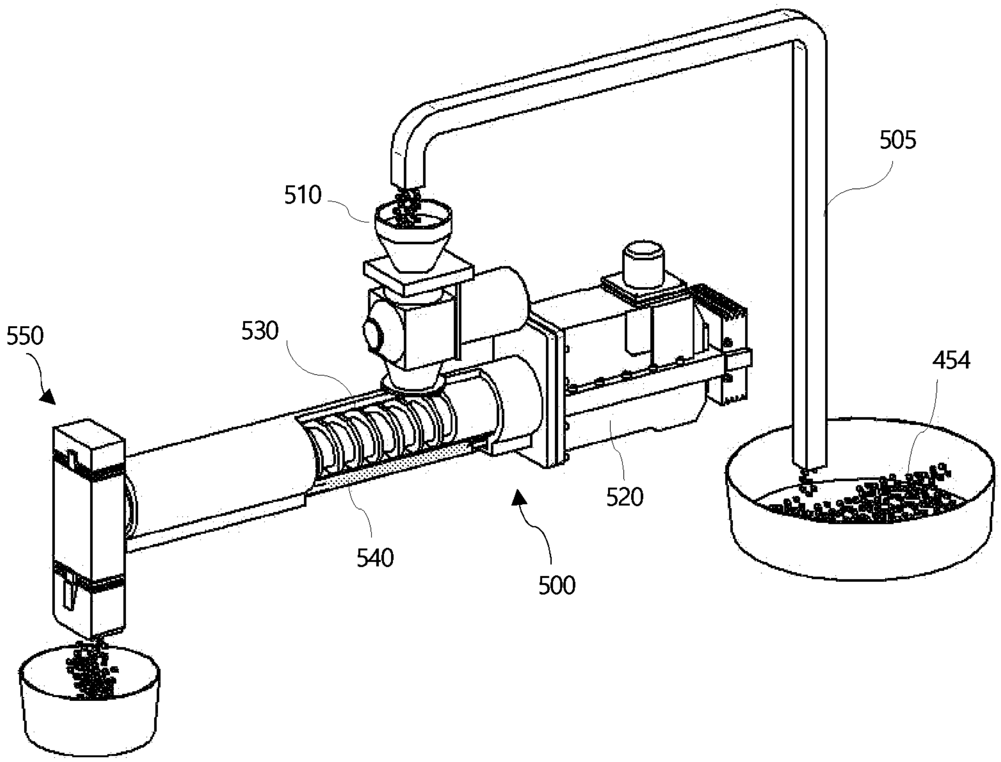
FIG. 5 shows an embodiment of another extruder and another pelletizer to produce the final product of the recyclable EVA material.

FIG. 5 shows an embodiment of another extruder and another pelletizer to produce the final product of the recyclable EVA material. Here, the extruder 500 shown in FIG. 5 is a partial sectional view to show the rotating screw 530 for illustration purposes.

As shown in FIG. 5, after classifying has been completed, the recyclable EVA material 454 can be put into the extruder 500 manually or automatically. Here, to add the recyclable EVA material automatically, duct 505 or similar may be used to input the EVA material 454 into the extruder 500. When manually adding the recyclable EVA material, it may be added through hopper 510 or similar.

The inputted recyclable EVA material may be extruded by a rotating screw 530 driven by a driver 520, and the extruded material can be made into appropriately sized pellets using a pelletizer 550. Pellets that are made may be used as-is in new products, or it may be packaged and moved to the next step.

In one embodiment according to the present invention, the material may be heated while extruding the recyclable EVA material using the extruder 500. For this purpose, the extruder 500 may be equipped with a heater 540. However, the extruder 500 does not necessarily have to be equipped with a heater 540.

Effects of the Invention

A test result at a factory producing commercial products shows that it is possible to produce commercial products with satisfactory performance even when the recyclable EVA material obtained by the present invention is mixed 50:50 with EVA raw materials. This is a very high level of recycling rate compared to existing products and methods where only about 10% of recycled EVA material was used. As a result, it will be possible to recycle most EVA waste, which was mostly discarded as trash in the past. Thus, it is a very fruitful result in economic and environmental aspects.

What is claimed is:

1. A method of producing recyclable Ethylene-vinyl acetate (EVA) material from EVA waste, comprising:

first step of inputting EVA waste into a first heating chamber;

second step of breaking or weakening crosslinking chains of the EVA waste, the second step including:

heating the EVA waste in the first heating chamber to 180-200° C. using a heater, and rotating a rotor at 40-60 rpm to agitate the EVA waste;

third step of obtaining recyclable EVA material by extruding the EVA waste obtained in the second step using a first extruder;

fourth step of curing the recyclable EVA material obtained in the third step at room temperature for a predetermined amount of time;

fifth step of breaking or weakening the crosslinking chains remaining in the recyclable EVA material, the fifth step including:

inputting the recyclable EVA material obtained in the fourth step into a second heating chamber, heating the recyclable EVA material in the second heating chamber, and agitating the recyclable EVA material;

sixth step of extruding the recyclable EVA material obtained in the fifth step using a second extruder and forming the recyclable EVA material to pellets using a first pelletizer;

seventh step of removing impurities from the recyclable EVA material obtained in sixth step, the seventh step including:

pulverizing the recyclable EVA material to particles using a pulverizing machine, and classifying the particles using a classifier to remove the impurities, whereby the method restores properties of the EVA material by breaking or weakening crosslinking chains of the EVA waste without adding a chemical.

2. The method according to claim 1, wherein the second step further including:

maintaining pressure inside the heating chamber at 9 kg/cm2 to 11 kg/cm2.

3. The method according to claim 1, wherein the first heating chamber used in the second step and the second heating chamber used in the fifth step are the same one.

4. The method according to claim 1, wherein a duration of said heating the EVA waste in the second step is about 1 hour, and a duration of said heating the recyclable EVA material in fifth step is about 20-30 minutes.

5. The method according to claim 1, wherein in third step, the EVA waste is heated to 180-200° C. while passing through the first extruder.

6. The method according to claim 1, wherein in the fourth step, the predetermined amount of time for curing is 1-2 days.

7. The method according to claim 1, wherein in the seventh step, the classifier classifies the particles according to weight or size of the particles.

8. The method according to claim 1, wherein in the seventh step, a size of the particles is 1 mm.

9. The method according to claim 1, further comprising eighth step of extruding the recyclable EVA material obtained in seventh step using a third extruder and forming the recyclable EVA material to pellets using a second pelletizer.

10. The method according to claim 9, wherein the third extruder used in eighth step and the second extruder used in sixth step is the same one.

11. An apparatus for producing recyclable Ethylene-vinyl acetate (EVA) material from EVA waste, comprising:

a first heating chamber including:

a chamber body capable to maintain an internal temperature and maintain an internal pressure;

an inlet provided at a side of the chamber body to input EVA waste;

a rotor installed at a side of the chamber body to provide rotational force;

a rotating plate provided at one end of the rotor and configured to agitate the EVA waste while rotating;

a heater provided inside or outside the chamber body and configured to heat the inside of the chamber; and a pressurizer for applying pressure to the EVA waste introduced into the first heating chamber; and a first extruder configured to extrude the EVA waste processed by the first heating chamber to make recyclable EVA material;

wherein:

the pressurizer is configured to apply the pressure of 9 kg/cm2 to 11 kg/cm2 to the EVA waste inside the first heating chamber;

the rotor is configured to rotate at 40-60 rpm to agitate the EVA waste inside the first heating chamber; and the heater is configured to heat the EVA waste inside the first heating chamber to 180-200° C., thereby breaking crosslinking chains of the EVA waste, whereby the system restores properties of the EVA material by breaking or weakening crosslinking chains of the EVA waste without adding a chemical.

12. The method according to claim 11, wherein the apparatus further includes a second heating chamber, a second extruder, and a first pelletizer, wherein the second heating chamber is configured to heat the recyclable EVA material obtained from the first extruder, and the second extruder and the first pelletizer are configured to form the recyclable EVA material into pellets.

13. The method according to claim 12, wherein the apparatus further comprises a pulverizing machine and a classifier, wherein the pulverizing machine is configured to form the recyclable EVA material obtained from the first pelletizer into particles of a predetermined size; and the classifier is configured to remove impurities from the particles.

14. The method according to claim 11, wherein the first extruder is configured to heat the EVA waste to 180-200° C.

15. The method according to claim 12, wherein the classifier is a centrifuge that classifies the impurities according to weight or size of the pellets.

16. The method according to claim 13, wherein the pulverizing machine includes rotating blades that are configured to break the recyclable EVA material into small pieces, and a screen having a plurality of holes of a predetermined diameter.

17. The method according to claim 16, wherein the predetermined diameter is 1 mm.

18. The method according to claim 13, wherein the apparatus further comprises a third extruder and a second pelletizer, wherein the third extruder and the second pelletizer are configured to extrude the recyclable EVA material obtained from the classifier to form pellets.

* * * * *